3,001,859
METHOD OF STIMULATING PLANT GROWTH
Marvin Paulshock, Wilmington, Del., assignor to E. I. du Pont de Nemours and Company, Wilmington, Del., a corporation of Delaware
No Drawing. Filed May 14, 1958, Ser. No. 735,131
2 Claims. (Cl. 71—2.3)

This invention relates to plant growth regulant compositions and methods employing certain 2-nitrovinylaryl amines.

It has been found that compounds represented by the following formula possess a most unique type of plant growth regulant activity; when applied in accordance with the present method, they act as strong stimulants for the growth of flowers and fruit:

(1) 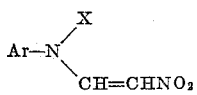

wherein Ar is selected from the group consisting of phenyl, chlorophenyl, dichlorophenyl, trichlorophenyl, methoxyphenyl, ethoxyphenyl, propoxyphenyl, hydroxyphenyl, dimethylaminophenyl, tolyl and cumyl; . . . and X is selected from the group consisting of hydrogen, alkyl groups of one through four carbon atoms and 2-nitrovinyl.

The bisnitrovinyl compounds of Formula 1 can be prepared from methazonic acid and an arylamine or substituted arylamine, in accordance with the following representative equation:

(2) 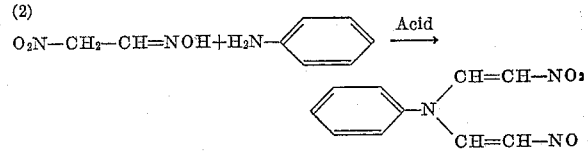

The reaction can be carried on initially in an aqueous acid such as 1–10 N hydrochloric or sulfuric acid. A suitable temperature range is from about 20–100° C. The temperature of the reaction mixture ordinarily is sufficiently high to dissolve the arylamine in the aqueous acid prior to the addition of the methazonic acid.

The reaction proceeds best when two or more mole equivalents of methazonic acid to one mole of the arylamine are employed.

The amount of acid used should be in excess of two mole equivalents of the arylamine. When the acid is used in amounts ranging from 3 to 10 mole equivalents of acid to one mole equivalent of arylamine, the best yields are obtained.

Under the conditions set forth above the reaction proceeds rapidly in most instances, proceeding to completion in a few minutes. However, in some instances the reaction takes several hours to complete.

The methazonic acid used in this reaction can be prepared in any conventional manner. For example, it can be prepared from nitromethane in an aqueous alkali medium.

The mononitrovinyl compounds represented by Formula 1 can be prepared by the method of W. Meister, Ber., 40, 3435 (1907), or by this method as modified by J. P. Freeman and W. D. Emmons, J. Am. Chem. Soc., 78, 3405 (1956), in accordance with the following representative equation:

(3) 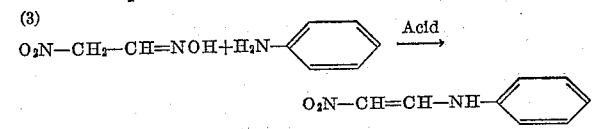

In general, an acidified solution of methazonic acid is added to an acidified solution of an aromatic amine. An excess of acid is not used, as it is in the preparation of the bisnitrovinyl compounds. Rather, approximately equimolar amounts of methazonic acid, amine and mineral acid are used.

In use the compounds represented by Formula 1 can be applied to plants in any of a variety of compositions. Ordinarily the compounds will be extended with a carrier material or conditioning agent of the kind used and commonly referred to in the art as a plant growth regulant adjuvant or modifier. Such adjuvants are inert solids, surface-active agents and organic liquids.

The dinitrovinyl compounds of this invention are highly flammable and some may be detonated by impact. For this reason they cannot safely be prepared as concentrated wettable powders. They are safe when extended to 20% dusts. The following paragraph applies to mononitrovinyl compounds only, except for the preparation of dilute dusts.

Solid formulations can be prepared with inert powders. The formulations thus can be homogeneous powders that either can be used as such, diluted with inert solids to form dusts, or suspended in a suitable liquid medium for spray application. The powders usually comprise active ingredient admixed with a conditioning agent. Natural clays (either absorptive such as attapulgite or relatively non-absorptive such as china clays), diatomaceous earth, synthetic fine silica, calcium silicate and other inert solid carriers of the kind conventionally employed in powder fungicidal compositions can be used. The active ingredient usually makes up from about 5 to 90% of these powder compositions. The solids ordinarily should be very finely divided and should have a particle size below about 50 microns and preferably below about 20 microns. For conversion of the powders to dusts, talc, pyrophyllite, volcanic ash and other dense, rapid-settling inert solids customarily are used.

Liquid compositions including the active compounds described above can be prepared by admixing the compound with a suitable liquid diluent medium. A suitable liquid diluent medium for the dinitrovinyl compounds is water in which they may be safely ground and dispersed. Mononitrovinyl compounds may be dissolved or dispersed in either water or oil. The active compound can be either in solution or in suspension in the liquid medium. Where the composition is to be used to stimulate plant growth, for example to stimulate flower or fruit growth, a nonphytotoxic liquid diluent should, of course, be employed. The active ingredient usually will make up from about 0.5 to 50% by weight of these liquid compositions. Some of these compositions are designed to be used as such, and others to be extended with large quantities of water or organic liquid.

Compositions in the form of wettable powders or liquids can also include one or more surface-active agents such as wetting, dispersing or emulsifying agents. Thus mixtures of the above liquids with the active compounds can contain an emulsifying agent to make an emulsifiable oil composition. The surface-active agents of the liquid or dry compositions cause them to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, Nos. 7–10 (1955).

The compounds can be applied in compositions of the type shown in Jones U.S. Patent 2,412,510 in which an active compound of the invention replaces the active materials of that patent in the composition shown and in like amounts. Similarly any of the carriers, additives or surface-active agents there named or referred to can be used.

The method of regulating the growth of plants in accordance with the present invention comprises applying a compound represented by Formula 1 ordinarily in a plant growth regulant composition such as those described above to the plant, that is directly to the plant itself or to the locus or area where the plant is or will be growing. The active compound is, of course, applied in sufficient amount to exert the desired plant growth regulation. The application can be made directly upon the plant foliage, or it can be made to the soil where the plant is growing or is to be planted.

The dosage that is sufficient to regulate plant growth can be determined readily by those skilled in the art by conventional techniques. It is, of course, dependent upon the particular active ingredient employed, the nature of the formulation used, the type of treatment, the type of vegetation to which it is applied, climatic conditions and the like. In general, application at rates within the range of about 1 to 20 lbs. per acre has been found sufficient to stimulate flower and fruit growth and production, that is, increase the number of flowers and fruits present on treated plants.

In order that the invention can be better understood, the following examples are given in addition to those set forth above:

Example 1

A mixture of 16.2 parts of 3,4-dichloroaniline, 105.6 parts of concentrated hydrochloric acid and 176 parts of water are mixed together to form a slurry. To the mixture is added a solution of methazonic acid prepared from 40 parts of nitromethane and estimated to contain 21 to 22 parts of methazonic acid. The reaction mixture is stirred at room temperature for 4 hours, and then filtered. Recrystallization of the crude reaction mixture gives two products. The higher melting fraction, M.P. 207–208° C. is N,N-bis(2-nitrovinyl)-3,4-dichloroaniline.

*Analysis.*—Calcd. for $C_{10}H_7N_3O_4Cl_2$: C, 39.49; H, 2.32. Found: C, 39.23; H, 2.43.

Examples 2–13

The following compounds are prepared in accordance with the procedure of Example 1 by using in place of the dichloroaniline reactant and the reaction conditions of Example 1 those set forth in the following table:

| Example | Name of Aryl Amine | Wt. of Amine | Wt. of Methazonic Acid | Wt. of 37% Hydrochloric Acid | Wt. of Water | Product | Temperature, °C. |
|---|---|---|---|---|---|---|---|
| 2 | 4-chloroaniline | 6.35 | 10.4 | 42 | 140 | N,N-bis-(2-nitrovinyl)-4-chloroaniline | 25 |
| 3 | aniline | 1.8 | 3.12 | 15 | 10 | N,N-bis-(2-nitrovinyl)-aniline | 50 |
| 4 | 2-chloroaniline | 6.35 | 10.4 | 42 | 140 | N,N-bis-(2-nitrovinyl)-2-chloroaniline | 25 |
| 5 | 2,3,6-trichloroaniline | 9.8 | 10.4 | 42 | 168 | N,N-bis-(2-nitrovinyl)-2,3,6-trichloroaniline | 25 |
| 6 | 4-methoxyaniline | 6.2 | 10.4 | 42 | 168 | N,N-bis-(2-nitrovinyl)-4-methoxyaniline | 40 |
| 7 | 4-dimethylaminoaniline | 6.8 | 10.4 | 42 | 125 | N,N-bis-(2-nitrovinyl)-4-dimethylaminoaniline | 30 |
| 8 | 4-hydroxyaniline | 5.5 | 10.4 | 42 | 200 | N,N-bis-(2-nitrovinyl)-4-hydroxyaniline | 65 |
| 9 | 2-hydroxyaniline | 5.5 | 10.4 | 42 | 150 | N,N-bis-(2-nitrovinyl)-2-hydroxyaniline | 0 |
| 10 | 2-propoxyaniline | 7.6 | 10.4 | 42 | 170 | N,N-bis-(2-nitrovinyl)-2-propoxyaniline | 25 |
| 11 | p-toluidine | 5.4 | 10.4 | 42 | 170 | N,N-bis-(2-nitrovinyl)-p-toluidine | 50 |
| 12 | m-toluidine | 5.4 | 10.4 | 42 | 200 | N,N-bis-(2-nitrovinyl)-m-toluidine | 10 |
| 13 | 4-isopropylaniline | 6.8 | 10.4 | 42 | 175 | N,N-bis-(2-nitrovinyl)-4-isopropylaniline | 45 |

Example 14

A mixture of 16.2 parts of 3,4-dichloroaniline, 10 parts of concentrated hydrochloric acid and 150 parts of water is made. To this is added a solution of methazonic acid prepared from 20 parts of nitromethane and estimated to contain from 10 to 12 parts of methazonic acid. The reaction mixture is stirred at room temperature for two hours and then filtered. Recrystallization of the crude precipitate from methanol-water gives pure 3,4-dichloro-N-(2-nitrovinyl)aniline, M.P. 137–138° C.

*Analysis.*—Calcd. for $C_8H_6O_2N_2Cl_2$: C, 41.21; H, 2.59; N, 12.02. Found: C, 41.37; H, 2.55; N, 11.93.

Examples 15–29

The following compounds are prepared in accordance with the procedure of Example 14, by using in place of the dichloroaniline reactant and the reaction conditions of Example 14 those set forth in the following table:

| Example | Name of Aryl Amine | Wt. of Amine | Wt. of Methazonic Acid | Wt. of 37% Hydrochloric Acid | Wt. of Water | Product | Temperature, °C. |
|---|---|---|---|---|---|---|---|
| 15 | 4-chloroaniline | 12.7 | 10.4 | 10 | 150 | 4-chloro-N-(2-nitrovinyl)-aniline | 25 |
| 16 | aniline | 3.6 | 3.12 | 4 | 50 | N-(2-nitrovinyl)aniline | 25 |
| 17 | 2-chloroaniline | 12.7 | 10.4 | 10 | 150 | 2-chloro-N-(2-nitrovinyl)aniline | 25 |
| 18 | 2,3,6-trichloroaniline | 19.6 | 10.4 | 10 | 150 | 2,3,6-trichloro-N-(2-nitrovinyl)aniline | 25 |
| 19 | 4-methoxyaniline | 12.4 | 10.4 | 10 | 150 | 4-methoxy-N-(2-nitrovinyl)aniline | 25 |
| 20 | 4-dimethylaminoaniline | 13.6 | 10.4 | 10 | 150 | 4-dimethylamino-N-(2-nitrovinyl)aniline | 25 |
| 21 | 4-hydroxyaniline | 11.0 | 10.4 | 10 | 150 | 4-hydroxy-N-(2-nitrovinyl)aniline | 25 |
| 22 | 2-hydroxyaniline | 11.0 | 10.4 | 10 | 150 | 2-hydroxy-N-(2-nitrovinyl)aniline | 25 |
| 23 | 2-propoxyaniline | 15.2 | 10.4 | 10 | 150 | 2-propoxy-N-(2-nitrovinyl)aniline | 25 |
| 24 | p-toluidine | 10.8 | 10.4 | 10 | 150 | N-(2-nitrovinyl)-p-toluidine | 100 |
| 25 | m-toluidine | 10.8 | 10.4 | 10 | 150 | N-(2-nitrovinyl)-m-toluidine | 100 |
| 26 | 4-isopropylaniline | 13.6 | 10.4 | 10 | 150 | 4-isopropyl-N-(2-nitrovinyl)aniline | 50 |
| 27 | 3,4-dichloro-N-methylaniline | 17.6 | 10.4 | 10 | 150 | 3,4-dichloro-N-methyl-N-(2-nitrovinyl)aniline | 25 |
| 28 | 4-chloro-N-ethylaniline | 15.6 | 10.4 | 10 | 150 | 4-chloro-N-ethyl-N-(2-nitrovinyl)aniline | 25 |
| 29 | N-butylaniline | 15.0 | 10.4 | 10 | 150 | N-butyl-N-(2-nitrovinyl)-aniline | 25 |

Example 30

The following wettable powder compositions are prepared by blending together the listed ingredients and then grinding and deagglomerating in a micropulverizer until the average particle size is less than 50 microns. The resulting product is a wettable powder that can be dispersed in water by simple stirring, and which can then be applied as a dispersion from conventional spray equipment.

A

| | Percent |
|---|---|
| 3,4-dichloro-N-(2-nitrovinyl)aniline | 75 |
| Polyethylene oxide esters of mixed resin and fatty acids, concreted with urea | 3 |
| Low viscosity methyl cellulose | 0.25 |
| Attapulgite clay | 21.75 |

This composition is extended with water at the rate of 8 lbs. per acre of the active ingredient in 80 gallons of water. One part of the thusly prepared sprayable formulation is applied as a foliar spray at the rate of 10 lbs. per acre of the active ingredient to three-week old tomato plants. A second portion of this sprayable formulation is applied to the soil in which is growing three-week old tomato plants. Thirty days after these treatments, the number of flowers and fruits on the treated plants is found to be markedly increased in comparison to untreated control plants. At harvest time, a substantial increase in the yield of tomatoes is noted.

When applied to peanuts, soybeans, lima beans, garden peas, wax beans, stringless green pods and Black Valentine beans (2 weeks old) at 5 lbs. per acre (active) as a soil-foliage spray, an increase in flower number is noted at the blossom stage. At harvest time a marked increase in the number and weight of green bean is evident.

At 5 lbs. per acre active this formulation stimulates the flowering of crysanthemum plants.

B

| | Percent |
|---|---|
| N-(2-nitrovinyl)aniline | 50 |
| Oleyl ester of sodium isethionate | 1 |
| Sodiumligno sulfonate | 1 |
| China clay (kaolin) | 48 |

This composition is extended with water at the rate of 10 lbs. per acre of the active ingredient in 100 gallons of water. One portion of the thusly prepared sprayable formulation is applied to the foliage at the rate of 10 lbs. per acre of the active ingredient to two-week old stringless green pod beans. A second portion of this sprayable formulation is applied at the rate of 15 lbs. per acre to the soil in which is growing two-week old plants of the above variety. Twenty days after these treatments, it is noted that the number of flowers and fruits is increased in comparison with untreated plants. An increase in fruit yield is also noted on the treated plants at harvest time.

Additional wettable powder compositions are prepared identical to composition B above except replacing the active ingredient of composition B with an equal amount of the following compounds:

N-(2-nitrovinyl)-4-dimethylaminoaniline
N-(2-nitrovinyl)-4-hydroxyaniline
N-(2-nitrovinyl)-4-chloroaniline
3,4-dichloro-N-methyl-N-(2-nitrovinyl)aniline
N-(2-nitrovinyl)aniline The resultant compositions are extended with water as was done with composition B to give sprayable formulations. These formulations are applied to the foliage at the rate of 10 lbs. per acre of the active ingredient to two-week old soybeans, Black Valentine beans, and green peas. It is found that in each instance these treatments give an increase in flower and fruit production.

*Example 31*

The following dust compositions are prepared by blending and grinding together in a micropulverizer the active ingredient and the diluent until a homogeneous mixture of these two materials is obtained.

A

| | Percent |
|---|---|
| N,T-bis-(2-nitrovinyl)-p-chloraniline | 20 |
| Talc | 80 |

This dust composition is applied using a conventional hand duster at the rate of 5 lbs. per acre of the active ingredient to two-week old wax bean, pinto bean, and Black Valentine bean plants. Thirty days after this treatment, as a result of axillary bud stimulation, an increase in the number of flowers on the treated plants is noted in comparison to non-treated plants. When harvested, an increase in green bean yields is noted.

At 5 lbs. per acre (active) the formulation causes flower stimulation on chrysanthemum plants.

The following dust compositions are prepared and used in accordance with composition A above, giving substantially identical results.

B

| | Percent |
|---|---|
| N,N-bis-(2-nitrovinyl)-4-propoxyaniline | 20 |
| Micaceous talc | 80 |

C

| | |
|---|---|
| N,N-bis-(2-nitrovinyl)-m-toluidine | 15 |
| Pyrophyllite | 85 |

Additional compositions are prepared having identical composition as composition A of Example 30 above, except containing in place of the active ingredient of composition A an equal amount of the following active ingredients:

N,N-bis-(2-nitrovinyl)-p-toluidine
2-chloro-N-(2-nitrovinyl)aniline
2,3,6-trichloro-N-(2-nitrovinyl)aniline
4-methoxy-N-(2-nitrovinyl)aniline
4-dimethylamino-N-(2-nitrovinyl)aniline
4-hydroxy-N-(2-nitrovinyl)aniline
2-hydroxy-N-(2-nitrovinyl)aniline
2-propoxy-N-(2-nitrovinyl)aniline
N-(2-nitrovinyl)-p-toluidine
N-(2-nitrovinyl)-m-toluidine
4-isopropyl-N-(2-nitrovinyl)aniline
4-chloro-N-ethyl-N-(2-nitrovinyl)aniline
N-butyl-N-(2-nitrovinyl)aniline These compositions are extended with water at the rate of three gallons of the composition in 100 gallons of water forming dilute sprays in which the particles are substantially non-flocculated. When applied at the rate of 10 lbs. per acre of the active ingredient to red clover, timothy, orchard grass and Black Valentine bean, when the plants are four inches tall, an increase in the number of flowers and fruit is noted, and also an increase in the yield of forage seeds at harvest time.

*Example 32*

| | Percent |
|---|---|
| N,N-bis(2-nitrovinyl)aniline | 25 |
| Cross-linked polyacrylic acid | 0.35 |
| NaOH | 0.09 |
| Polyvinyl alcohol low viscosity | 1.00 |
| Water | 73.56 |

The above components are mixed together and wet milled in a pebble mill or sand mill until the active material is substantially all below 5 microns. The resulting stable aqueous suspension may be further diluted with water at the time of spraying.

The above formulation is applied as a soil-foliage spray to two-week old Black Valentine beans at the rate of 5 lbs. active per acre in 80 gallons water. An increase in number of blossoms, number of fruits, and number of leaflets is noted. At harvest time an increase in the number and weight of beans is noted.

Additional formulations are prepared having identical composition as the composition of Example 32 above, except containing in place of the active ingredient of Example 32 an equal amount of the following active ingredients:

N,N-bis-(2-nitrovinyl)-2-chloroaniline
N,N-bis-(2-nitrovinyl)-2,3,6-trichloroaniline
N,N-bis-(2-nitrovinyl)-4-methoxyaniline
N,N-bis-(2-nitrovinyl)-2-hydroxyaniline
N,N-bis-(2-nitrovinyl)-4-isopropylaniline The compounds in the formulations listed above are applied as a soil-foliage spray at the rate of 8 lbs. per acre in 80 gallons of water to two-week old soybeans, Black Valentine beans, and wax beans and give an increase in flowers and fruits.

This application is a continuation-in-part of my co-pending application Serial No. 657,713, filed May 8, 1957, and now abandoned.

I claim:

1. The method comprising applying to plants, at a rate within the range of about 1 to 20 pounds per acre, a compound represented by the formula

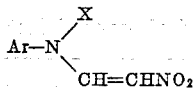

wherein Ar is selected from the group consisting of phenyl, chlorophenyl, dichlorophenyl, trichlorophenyl, methoxyphenyl, ethoxyphenyl, propoxyphenyl, hydroxyphenyl, aminophenyl, tolyl or cumyl; and X is selected from the group consisting of hydrogen, alkyl groups of from one through four carbon atoms and 2-nitrovinyl.

2. The method for stimulating the growth of plants comprising applying to the plants, in an amount sufficient to stimulate the growth of the plants, a compound represented by the formula

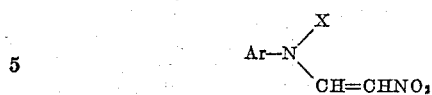

wherein Ar is selected from the group consisting of phenyl, chlorophenyl, dichlorophenyl, trichlorophenyl, methoxyphenyl, ethoxyphenyl, propoxyphenyl, hydroxyphenyl, aminophenyl, tolyl or cumyl; and X is selected from the group consisting of hydrogen, alkyl groups of from one through four carbon atoms and 2-nitrovinyl.

References Cited in the file of this patent

UNITED STATES PATENTS 2,292,212   Dickey et al. _____ Aug. 4, 1942

OTHER REFERENCES

Wieland et al.: In "Berichte," pages 898 to 904, vol. 52, 1919.

Freeman et al.: "American Chemical Society Journal," vol. 78, July–September 1956, pages 3405–3408.

Freeman et al.: In "Chemical Abstracts," vol. 50, 1956, col. 14597(h).